3 Sheets—Sheet 1.
A. STROMBERG.
ELECTRIC BURGLAR ALARM.
No. 11,423. Reissued June 26, 1894.
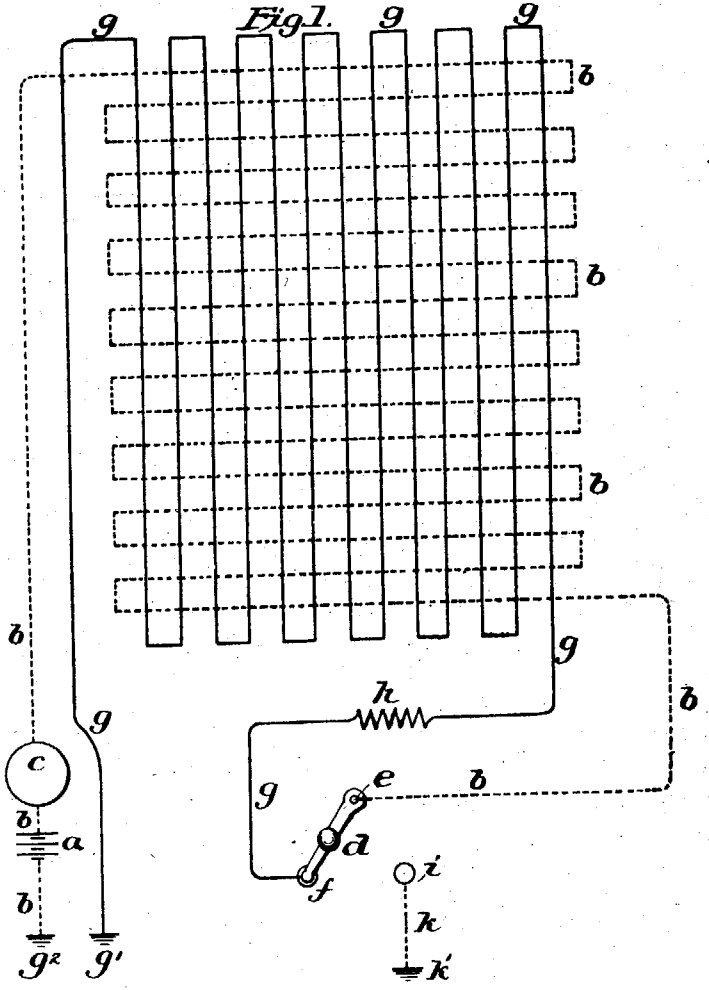
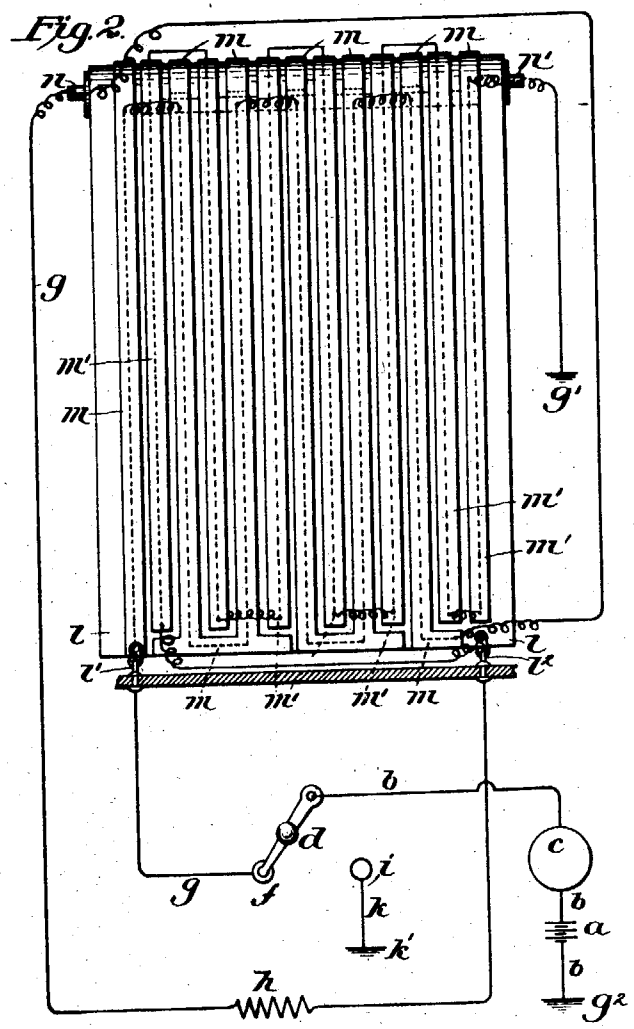
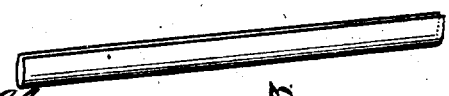
Witnesses.
George L. Cragg.
W. Clyde Jones.
Inventor.
Alfred Stromberg
By Parton & Brown
Attorneys.

3 Sheets—Sheet 2.

A. STROMBERG.

ELECTRIC BURGLAR ALARM.

No. 11,423. Reissued June 26, 1894.

Witnesses.
George L. Cragg.
W. Clyde Jones.

Inventor.
Alfred Stromberg
By Barton & Brown
Attorneys.

3 Sheets—Sheet 3.

A. STROMBERG.

ELECTRIC BURGLAR ALARM.

No. 11,423. Reissued June 26, 1894.

Witnesses.
George L. Cragg.
W. Clyde Jones.

Inventor.
Alfred Stromberg.
By Barton & Brown
Attorneys.

UNITED STATES PATENT OFFICE.

ALFRED STROMBERG, OF CHICAGO, ILLINOIS, ASSIGNOR OF ONE-HALF TO MARK SIMONS, OF SAME PLACE.

ELECTRIC BURGLAR-ALARM.

SPECIFICATION forming part of Reissued Letters Patent No. 11,423, dated June 26, 1894.

Original No. 483,728, dated October 4, 1892. Application for reissue filed May 31, 1894. Serial No. 513,112.

*To all whom it may concern:*

Be it known that I, ALFRED STROMBERG, a citizen of the United States, residing at Chicago, in the county of Cook and State of Illinois, have invented a certain new and useful Improvement in Electric Burglar-Alarms, (Case No. 2,) of which the following is a full, clear, concise, and exact description, reference being had to the accompanying drawings, forming a part of this specification.

My invention relates to electrical burglar alarms, and more particularly to that class of burglar alarms in which a central office is equipped with apparatus adapted to give an alarm when the district circuit is opened.

Its object is by an arrangement and construction of circuits to protect the system against interference and to insure the reliability of the alarm.

In my invention, I employ closed circuits, and I preferably place each district to be protected upon a separate metallic circuit. The general system which I employ is capable of application to numerous situations, as for example windows, doors, elevator wells, &c.

I have deemed it only necessary to give examples of the employment of my invention, which are illustrated in the accompanying drawings, in which—

Figure 4:
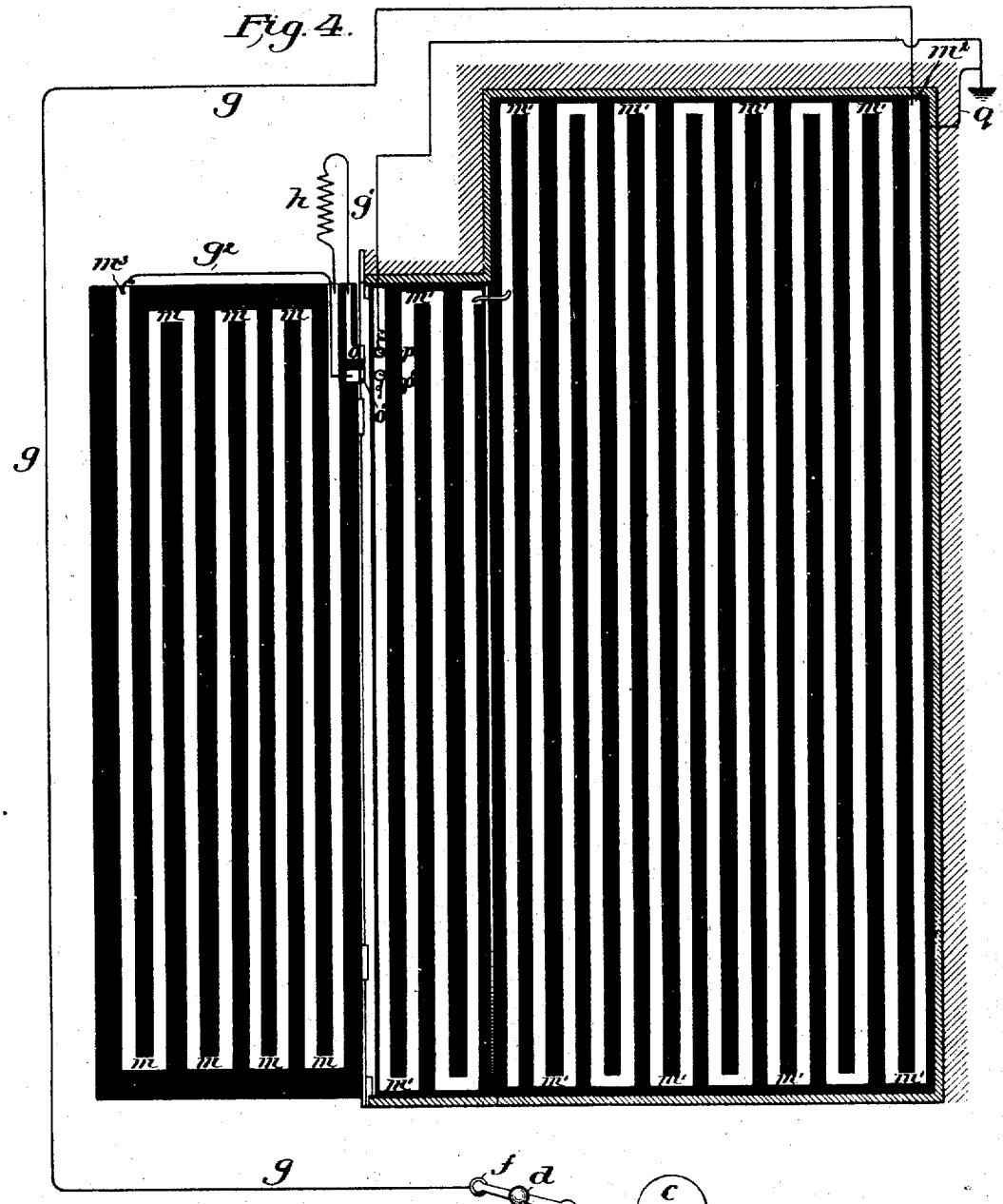
Figure 5:
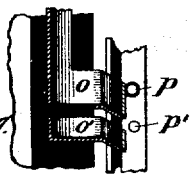
Figure 6:
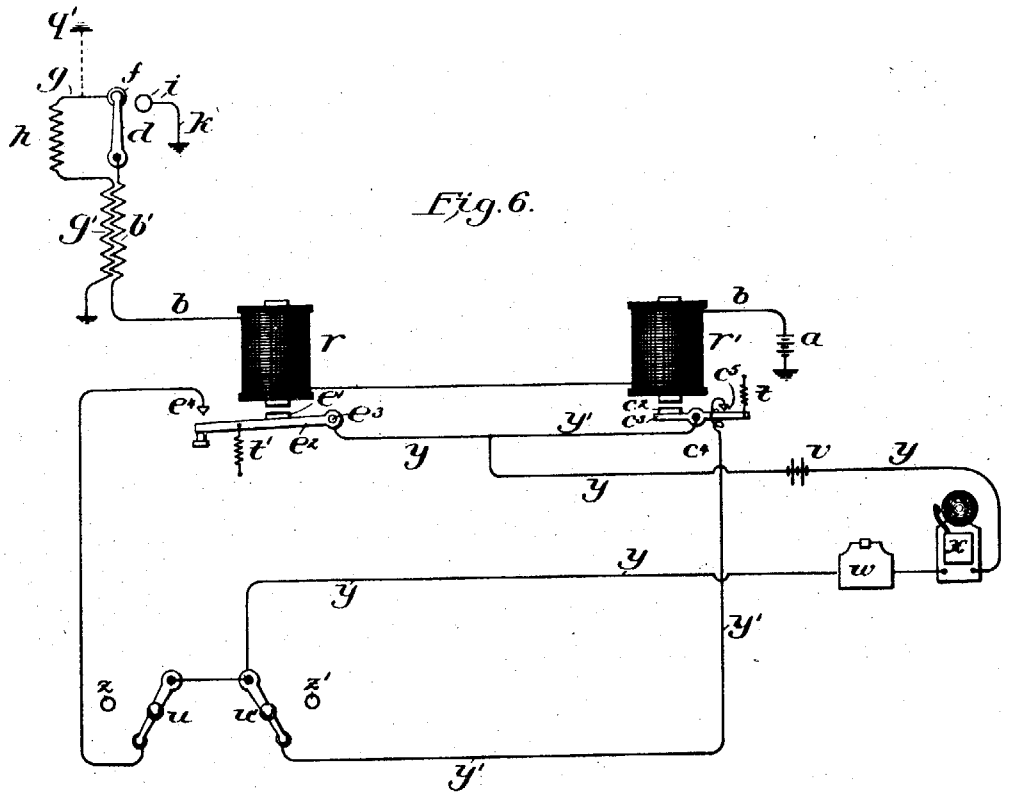

Figure 1 is a diagram of circuits as applied to protecting screens. Fig. 2 illustrates the application of my invention to window shades. Fig. 3 is illustrative of the manner of mounting the tinfoil upon flexible surfaces, as hereinafter described. Fig. 4 is a diagrammatical view showing one manner of protecting vaults. Fig. 5 is a detail view of the angle plates which I employ in connection with protecting vaults. Fig. 6 is a diagrammatic illustration of a set of recording devices that may be used in connection with my invention.

The parts are indicated by letters of reference throughout the different views, similar letters being indicative of like parts.

Referring more particularly to Fig. 1, the circuits may be traced as follows: The current emanating from battery $a$, passes by means of line wire $b$ through suitable responsive apparatus, represented by letter $c$, as hereinafter described, then continuing upon line wire $b$ passes to a switch $d$ pivoted at $e$, thence through said switch to a button $f$ when the free end of the switch rests thereon, then leads off from said button and by means of line wire $g$, passes through resistance $h$ and by line wire $g$ passes thence to ground $g'$ and thence to ground $g^2$, returning by line wire $b$ to the source $a$. The circuit, as I have described it, occurs only when the district which is desired to be protected is cut in. When the system is not in use the free end of switch $d$ is swung on button $i$, thus causing the current to pass from battery $a$ through the responsive apparatus $c$, by means of line wire $b$ through the switch $d$ to button $i$, thence by bypath $k$ to ground $k'$, and then returns to battery $a$ by ground $g^2$. The manner of arranging the line wires that I have shown in this view is a diagrammatical illustration of the meshing of wires in protecting screens. I preferably insulate the wires $b$ $b$ and $g$ $g$ with suitable insulating material throughout their length. The form and manufacture of these screens are old and well known, therefore I deem an illustration of the application of my invention thereto sufficient. These screens being composed of very fine wire are hardly perceivable and easily breakable. They may be placed so as to cover any possible means of ingress, as over the openings in fire escape platforms, over coal-holes, light and elevator wells, windows, transoms, &c. If an attempt at entry is made at any of these protected openings the circuit wires in the screen are broken, the circuit is opened and the alarm is sounded. If at any place the wire should be grounded the resistance $h$ is cut out and the fact evidenced by the alarm. If the wire $g$ should cross wire $b$, resistance $h$ is cut out and the alarm is sounded, all of which will be further set forth.

In protecting openings covered by flexible bodies, as those covered by curtains, or in the case of desks their curtain tops, I have found that a very valuable aid is the use of tinfoil, or other pliable material. I place as many strips of tin foil as necessary to sufficiently protect the opening against entry, upon the flexible body, there being preferably two sets, the strips of each set being electrically connected. These strips are preferably made four inches wide and as long as necessary. The strips are folded upon themselves once so as to expose a surface of two inches in width when pasted upon the flexible surface. The strips thus folded longitudinally present three edges, one being at the fold or crease and two being the free edges that formed the edges of the strip before folding. It is by one of these free edges of the folded strip that I attach it to the cover and it may be fastened throughout the total length of this edge, at points, or only at the extreme ends thereof; the essential point being to attach the strip by one of the free edges.

In forming curtains by this method I preferably place the strips upon a layer of cloth, attaching the strips in the manner described and then place over the strips thus placed in position a similar layer of cloth and attach it to the first layer. Thus the strips are attached to only one of the layers of cloth and the other layer serves to protect the tin foil strips and to prevent the flap or upper fold of the strip from leaving its position against the lower fold. The strips may be placed singly and parallel and their ends connected electrically by wires or one continuous strip may be used for each curtain by bending the strip at right angles to itself at the end to run perpendicular to itself to the position of the adjacent strip where it bends again at right angles to run parallel to the first strip, &c. A large free surface of foil is thus given, the flexibility thereof is insured and it is prevented from cracking and thereby opening the circuit. Immunity is thus given from false alarms. When the flexible covering is in place, one side $l$ thereof is fastened by means of suitable attachments $l'$ $l^2$. When the covering is thus fastened the circuit will be normally from the battery $a$ by wire $b$ through responsive apparatus $c$, from apparatus $c$ through wire $b$ to switch $d$, from switch $d$ by wire $g$ to attachment $l'$, thence from said attachment by a set of strips of tin foil $m$ to an insulated bearing $n$, upon which said cover is mounted, thence from said bearing by wire $g$ through resistance $h$ to the other attachment $l^2$, thence from said attachment by another set of strips of tin foil $m'$ to bearing $n'$ corresponding to bearing $n$, and lastly from said bearing by ground $g'$ to ground $g^2$ and back to battery $a$.

When it is desired to remove the cover, switch $d$ is swung so that its free end may rest upon button $i$, whereby the circuit is shunted from the battery $a$ through the responsive device $c$, wire $b$, switch $d$, button $i$, by-path $k$, grounds $k'$, $g^2$ back to battery $a$. The circuit being thus cut out, the cover may be removed without giving alarm. If, however, the switch should be upon button $f$, and the cover were removed, the circuit would be open and the alarm given. If the circuit should become grounded, the resistance $h$ would be cut out and the alarm also given. If the set of strips of tin foil $m$ should become electrically connected with set of strips $m'$ the resistance $h$ would be cut out and the alarm given.

Referring now to Fig. 4, it will be seen that my invention answers the purpose of protecting vaults. In equipping vaults, the metal surfaces, either inside or outside, are covered with insulating material, upon which may be fastened a set or two of strips of tin foil or other metal, normally in electrical connection. In the drawings I have shown the door of the vault open. Upon this door and preferably near the side where it is hung, I place angle plates $o$ $o'$ which are adapted to make contact with buttons $p$ $p'$ when said door is closed. When the vault door is closed the circuits will be as follows: from ground to battery $a$, by wire $b$ through indicating device $c$ and switch $d$ to line $g$, over line $g$ to point $m^2$, thence through the circuits upon the inside of the vault to button $p'$, then to angle plate $o'$, by wire $g^2$ to point $m^3$, then through the circuits upon the door, thence by wire $g$ through resistance $h$ to ground. In case the wires should become grounded, broken or crossed the resistance is cut out and the same result takes place as before. But if, as is usually the case, the metal is drilled in effecting entry, the drill, upon passing through, makes connection between the metal plate which is grounded and the tin foil causing the current to pass from the battery $a$ through responsive device $c$ and wire $b$ to switch $d$, thence through wire $g$ to the point $m^2$ and through the circuits upon the interior of the vault to the point where the foil is connected with the wall of the safe, thence through the walls of the safe and to ground by the half connection $g$. The resistance $h$ is thus cut out and the alarm given.

I will now give a description of the recording apparatus which I use in connection with my system. Referring now to Fig. 5, I represent the protected district by two sinuous lines $b'$ $g'$. The circuit is normally from battery $a$ through relays $r$ $r'$ by wire $b$ through one-half of the protected district $b'$ to switch $d$, thence from switch $d$ to resistance $h$ by wire $g$, thence through the other half of the protected district $g'$ to ground, and back to battery $a$; the relay magnets $r$ $r'$ are thus energized, the attraction of magnet $r'$ being sufficient to attract the armature $c^2$ upon the armature lever $c^3$ pivoted at $c^4$ against the force of the spring $t$, thus breaking circuit at $c^5$. The force of spring $t'$ is sufficient to counteract the attraction of magnet $r$ upon its armature $e'$ upon the armature lever $e^2$, pivoted at $e^3$ thus breaking the circuit at $e^4$. If now, line $b$ or $g$ should become grounded at say $q'$, the current upon reaching the point of grounding will take the path of less resistance and travel directly to ground, thus shunting out resistance $h$. This resistance being cut out serves to increase the electromotive force reaching the magnet $r$ through wire $b$ sufficiently to cause the said magnet to counteract the resistance of the spring $t'$, thus closing the contact $e^4$. The local circuit being thus closed, the switch $u$ being in circuit may be traced from battery $v$ through annunciator $w$ causing its shutter to drop, through bell $x$, causing the alarm, then by line $y$ to armature lever $e^2$. If the circuit in the district should become broken the magnets lose their power, the armature levers fall and contact is made at $c^5$, where the circuit may be traced from battery $v$ through annunciator drop $w$, causing its shutter to fall, through the bell $x$ causing the alarm, by line $y$ to branch $y'$ to armature lever $c^3$, thence through the contact point $c^5$, wire $y'$ through switch $u'$ back by wire $y$ to the battery $v$. When the system is not used the switches $u$ $u'$ are swung upon the dead points $z$ $z'$.

Having thus described my invention, what I claim as new, and desire to secure by Letters Patent, is—

1. In an electric burglar alarm the combination with a battery $a$, one side of which is connected to ground, of suitable alarm recording apparatus connected with said battery, circuit wire $b$, another circuit wire $g$ one end of which is connected to ground, said wire $g$ crossing said wire $b$ and insulated therefrom, the resistance $h$, the switch $e$ adapted to connect wires $b$ and $g$ together or to connect wire $b$ to ground, substantially as and for the purpose specified.

2. In an electric burglar alarm, the combination with the flexible cover of an opening, of flexible metallic conducting strips attached thereto, said strips being folded longitudinally and attached to said covering by one of the free edges thereof, an electric circuit including said conducting strips, a resistance included in said circuit, and circuit breakers adapted to open said circuit when said flexible cover is moved, and responsive device adapted to be actuated when said circuit is broken or when said resistance is cut out of the circuit; substantially as described.

3. In an electric burglar alarm circuit, the combination with a flexible surface, of a series of pliable conducting strips, said strips being folded longitudinally and attached by one of the free edges thereof to said flexible surface, and electrical connections between said strips; substantially as described.

4. In an electric burglar alarm for metal inclosed vaults, the combination with strips of conducting material fastened to the sides and doors of the vault, but insulated therefrom, said strips of conducting material being included in series in an electric circuit, of a battery and a recording device included in said circuit, means for breaking said circuit to give an alarm when the door is opened, the metallic walls of the vault connected at one point to the circuit including the strips of conducting material, and suitable resistance located in said circuit and adapted to be cut out and give alarm when circuit is made between the metallic walls of the vault and the strips of conducting material; substantially as described.

In witness whereof I hereunto subscribe my name this 26th day of February, A. D. 1892.

ALFRED STROMBERG.

Witnesses:
M. J. FALLETT,
GEORGE L. CRAGG.